United States Patent
Lin et al.

(10) Patent No.: US 9,575,235 B2
(45) Date of Patent: Feb. 21, 2017

(54) LIGHT GUIDE ELEMENT AND LIGHTING FIXTURE

(71) Applicant: Radiant Opto-Electronics Corporation, Kaohsiung (TW)

(72) Inventors: Wei-Chen Lin, Kaohsiung (TW); Hui-Ching Hsueh, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 141 days.

(21) Appl. No.: 14/639,133

(22) Filed: Mar. 5, 2015

(65) Prior Publication Data

US 2015/0177442 A1    Jun. 25, 2015

Related U.S. Application Data

(63) Continuation-in-part of application No. 13/772,355, filed on Feb. 21, 2013, now Pat. No. 9,121,980.

(30) Foreign Application Priority Data

Sep. 28, 2012    (TW) .............................. 101135985 A

(51) Int. Cl.
    *F21V 8/00*    (2006.01)
(52) U.S. Cl.
    CPC ........... *G02B 6/0043* (2013.01); *G02B 6/0036* (2013.01); *Y10T 29/49002* (2015.01)
(58) Field of Classification Search
    CPC ........................... G02B 6/0043; G02B 6/0036
    See application file for complete search history.

(56) References Cited

U.S. PATENT DOCUMENTS

| 9,121,980 B2 * | 9/2015 | Lin ...................... G02B 6/0036 |
| 2003/0039112 A1 | 2/2003 | Chen et al. |
| 2011/0299013 A1 | 12/2011 | Ishida et al. |
| 2012/0218776 A1 | 8/2012 | Lee et al. |

FOREIGN PATENT DOCUMENTS

| CN | 1485658 A | 3/2004 |
| CN | 1746737 A | 3/2006 |
| CN | 1880978 A | 12/2006 |
| CN | 1916722 A | 2/2007 |
| CN | 101975373 A | 2/2011 |
| CN | 102033260 A | 4/2011 |

(Continued)

*Primary Examiner* — David V Bruce
(74) *Attorney, Agent, or Firm* — CKC & Partners Co., Ltd.

(57) ABSTRACT

A light guide element and a lighting fixture are described. The light guide element includes a light guide body, first microstructures and second microstructures. The light guide body includes a first light-emitting surface and a second light-emitting surface opposite to and parallel to each other. The first microstructures are disposed on the first light-emitting surface in rows. The second microstructures are respectively corresponding to the first microstructures and are disposed on the second light-emitting surface. In each of the rows, each of the first microstructures laps over the corresponding second microstructure in part in a normal direction of the first light-emitting surface. Overlapping ratio of the first microstructures and the corresponding second microstructures become greater from one end of one of the rows to the other end of the one of the rows.

12 Claims, 7 Drawing Sheets

(56) References Cited

FOREIGN PATENT DOCUMENTS

| | | |
|---|---|---|
| CN | 201984179 U | 9/2011 |
| CN | 202253389 U | 5/2012 |
| JP | 2004-111353 A | 4/2004 |
| JP | 2009-43471 A | 2/2009 |
| TW | M299866 U | 10/2006 |
| TW | M408644 U | 8/2011 |

* cited by examiner

LIGHT GUIDE ELEMENT AND LIGHTING FIXTURE

RELATED APPLICATIONS

This application is a continuation-in-part application of U.S. application Ser. No. 13/772,355 filed on Feb. 21, 2013, which claims priority to Taiwan Application Serial Number 101135985, filed Sep. 28, 2012. This application also claims priority to Taiwan Application Serial Number 101135985, filed Sep. 28, 2012. The entire disclosures of all the above applications are hereby incorporated by reference herein.

BACKGROUND

Field of Invention

The present invention relates to a light guide element, and more particularly to a light guide element and a method for manufacturing the same, and a lighting fixture.

Description of Related Art

Currently, in the manufacture of flat panel displays and lighting fixtures, light guide elements are widely used to broaden light-emitting scopes and provide uniform flat emitting light. Accordingly, the light guide elements have been one of the key components in the flat panel displays and the lighting fixtures.

The optical conduction principle of the light guide element is based on the Snell's Law. When light is going to enter a less dense medium from an optical dense medium, i.e. the light is going to enter the medium of a lower refractive index from the medium of a high refractive index, and an incident angle is greater than a critical angle, the light is totally reflected on an interface between the two mediums and cannot enter the less dense medium to advance forward within the optical dense medium. As compared with the air, the material of the light guide element is an optical dense medium, so that if the total reflection of the light on one surface of the two surfaces of the light guide element, where the light is totally reflected, is appropriately destroyed, the light can be uniformly emitted from the other surface to form a uniform light-emitting surface.

However, as the developing of the lighting fixtures, in addition to lighting, the lighting fixtures are sometimes designed for ornamentation. Currently, in order to provide a lighting fixture including both functions of lighting and ornamentation, a designed pattern is typically formed on one surface of the light guide element by arranging dots or microstructures according to the designed pattern, so as to make the emitting light of the light guide element show the pattern. However, for obtaining the light-emitting pattern on the local region of the light-emitting surface, the light is locally concentrated, and the brightness of the whole light-emitting surface is affected, so that the brightness of the light guide element is decreased, thereby reducing the lighting function of the lighting fixture.

Furthermore, when the pattern composed of the dots or the microstructures is formed on one surface of the light guide element, defects may be formed on the surface due to the processing. The pattern composed of the dots or the microstructures is processed based on the designed pattern, so that if the pattern has a deviation from the original designed pattern due to the defects, the deviation of the light-emitting pattern of the light guide element is obvious, thereby reducing the process yield.

SUMMARY

Therefore, one aspect f the present invention is to provide a light guide element and a method for manufacturing the same, and a lighting fixture, in which two opposite light-emitting surfaces of the light guide element are respectively set with many first microstructures and many corresponding second microstructures, and the first microstructure and the second microstructure vertically lap with each other to make emitting light of each light-emitting surface has a mesh pattern. Therefore, the brightness and the pattern design of the emitting light of the lighting fixture are both provided.

Another aspect of the present invention is to provide a light guide element and a method for manufacturing the same, and a lighting fixture, in which mesh patterns of two light-emitting surfaces are effects caused by lapping microstructures of the light-emitting surfaces, so that pattern defects of the emitting light caused by processing defects is blurred.

According to the aforementioned aspects, the present invention provides a light guide element. The light guide element includes a light guide body, first microstructures and second microstructures. The light guide body includes a first light-emitting surface and a second light-emitting surface opposite to and parallel to each other. The first microstructures are disposed on the first light-emitting surface in rows. The second microstructures are respectively corresponding to the first microstructures, and are disposed on the second light-emitting surface. In each of the rows, each of the first microstructures laps over the corresponding second microstructure in part in a normal direction of the first light-emitting surface. Overlapping ratios of the first microstructures and the corresponding second microstructures become greater from one end of one of the rows to the other end of the one of the rows.

According to a preferred embodiment of the present invention, the first microstructures include first arrangements and second arrangements. In the first arrangements, pattern centers of first ones of the first microstructures are uniformly disposed on first suppositional lines, and there is an interval between the adjacent first ones on each of the first suppositional lines. In the second arrangements, pattern centers of second ones of the first microstructures are uniformly disposed on second suppositional lines, there is the interval between the adjacent second ones on each of the second suppositional lines, a starting point of each of the second arrangement is deviated from a starting point of each of the first arrangements by a distance, the distance is less than the interval, and the first arrangements and the second arrangements are interlaced.

According to another preferred embodiment of the present invention, the first microstructures include a first arrangement and second arrangements arranged sequentially. In the first arrangement, pattern centers of first ones of the first microstructures are uniformly disposed on a first suppositional line, and there is an interval between the adjacent first ones. In the second arrangements, pattern centers of second ones of the first microstructures are uniformly disposed on second suppositional lines, there is the interval between the adjacent second ones on each of the second suppositional lines, and a relation between deviation distances of starting points of the second arrangements from a starting point of the first arrangement and distances between the second arrangements and the first arrangement is a functional relation.

According to still another preferred embodiment of the present invention, the functional relation is a sinusoidal function relation.

According to further another preferred embodiment of the present invention, the first microstructures include a first arrangement and second arrangements arranged sequentially. In the first arrangement, pattern centers of first ones of the first microstructures are uniformly and sequentially arranged in a manner of making heights of the pattern centers of the first ones being apart from a first suppositional line very as a sinusoidal function, and there is an interval between the adjacent first ones. In each of the second arrangements, pattern centers of second ones of the first microstructures are uniformly and sequentially arranged in a manner of making heights of the pattern centers of the second ones being apart from a second suppositional line very as a sinusoidal function, there is the interval between the adjacent second ones on each of the second suppositional lines, and a relation between deviation distances of starting points of the second arrangements from a starting point of the first arrangement and distances between the second arrangements and the first arrangement is a functional relation.

According to yet another preferred embodiment of the present invention, the functional relation is a sinusoidal function relation.

According to the aforementioned aspects, the present invention further provides a lighting fixture. The lighting fixture includes the aforementioned light guide element and at least one light source. The at least one light source is disposed at at least one side of the light guide element to provide the light guide element with an incident light.

According to the aforementioned aspects, the present invention further provides a light guide element. The light guide element includes a light guide body, first microstructures and second microstructures. The light guide body includes a first light-emitting surface and a second light-emitting surface opposite to and parallel to each other. The first microstructures are disposed on the first light-emitting surface. The second microstructures are respectively corresponding to the first microstructures, and are disposed on the second light-emitting surface. Each of the first microstructures laps over the corresponding second microstructure in part in a normal direction of the first light-emitting surface. The first microstructures and the second microstructures have the same size but different pitches.

According to a preferred embodiment of the present invention, a pattern center of at least one of the first microstructures is misalignment with a pattern center of t he corresponding second microstructure.

According to another preferred embodiment of the present invention, a pattern center of at least one of the first microstructures is alignment with a pattern center of the corresponding second microstructure.

According to the aforementioned aspects, the present invention further provides a lighting fixture. The lighting fixture includes the aforementioned light guide element and at least one light source. The at least one light source is disposed at at least one side of the light guide element to provide the light guide element with an incident light.

According to the aforementioned aspects, the present invention further provides a light guide element. The light guide element includes a light guide body, first microstructures and second microstructures. The light guide body includes a first light-emitting surface and a second light-emitting surface opposite to and parallel to each other. The first microstructures are disposed on the first light-emitting surface. The second microstructures are respectively corresponding to the first microstructures, and are disposed on the second light-emitting surface. Each of the first microstructures laps over the corresponding second microstructure in part in a normal direction of the first light-emitting surface. The first microstructures and the second microstructures have the same pitch but different sizes.

According to a preferred embodiment of the present invention, a pattern center of at least one of the first microstructures is misalignment with a pattern center of the corresponding second microstructure.

According to another preferred embodiment of the present invention, a pattern center of at least one of the first microstructures is alignment ith a pattern center of the corresponding second microstructure.

According to the aforementioned aspects, the present invention further provides a lighting fixture. The lighting fixture includes the aforementioned light guide element and at least one light source. The at least one light source is disposed at at least one side of the light guide element to provide the light guide element with an incident light.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION

Figure 1:
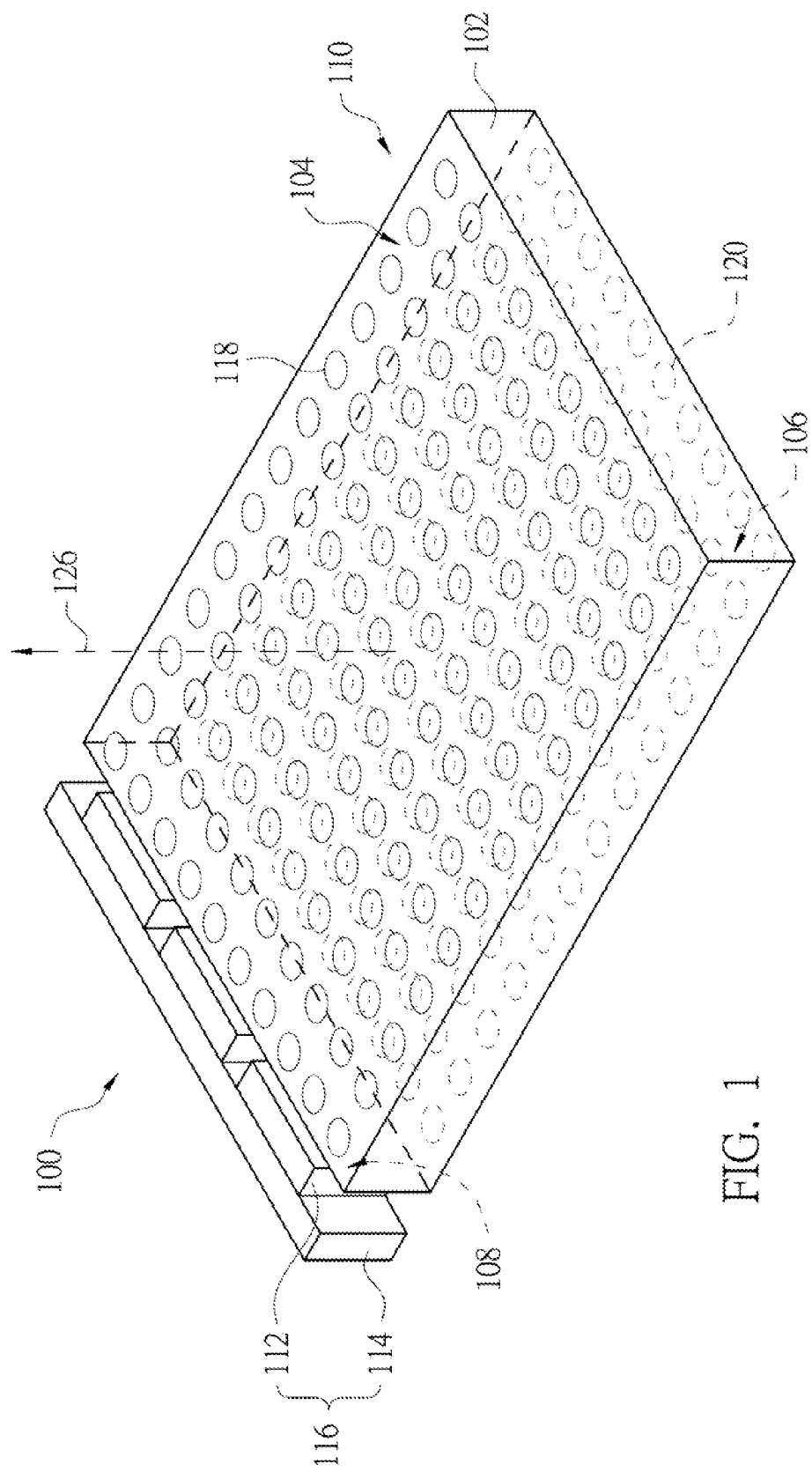
FIG. 1 is a schematic diagram showing a lighting fixture in accordance with an embodiment of the present invention.

Refer to FIG. 1. FIG. 1 is a schematic diagram showing a lighting fixture in accordance with an embodiment of the present invention. In the present embodiment; a lighting fixture 100 mainly includes a light guide element 110 and one or more light source, such as a light source 116. The light source 116 is disposed at one side of the light guide element 110 to provide the light guide element 110 with an incident light from the side of the light guide element 110.

The light guide element 110 includes a light guide body 102, a plurality of first microstructures 118 and a plurality of second microstructures 120. The light guide body 102 includes a first light-emitting surface 104 and a second light-emitting surface 106. The firstlight-emitting surface 104 and the second light-emitting surface 106 are opposite to each other, and parallel to each other. In addition, the light guide body 102 further includes a light-incidence surface 108, in which the light-incidence surface 108 is adjacent to the light source 116 and two opposite sides of the light-incidence surface 108 are respectively connected to the first light-emitting surface 104 and the second light-emitting surface 106. Light emitted from the light source 116 can enters the light guide element 110 through the light-incidence surface 108. The light-incidence surface 108 of the light guide element 110 is decided in relation to the light source 116, so that a side surface of the light guide element 110 that the light emitted from the light source 116 passes through to enter the light guide element 110 is referred as a light-incidence surface 108.

The light source 116 may be a light-emitting diode (LED) light bar or a lamp tube. In one exemplary embodiment, such as shown in FIG. 1, the light source 116 is a LED light bar and includes a circuit board 114 and a plurality of light-emitting diodes 112. The light-emitting diodes 112 are disposed on the circuit board 114 and are all electrically connected to a circuit of the circuit board 114. The light-emitting diodes 112 emit light toward the light incidence surface 108 of the light guide element 110.

The light guide element 110 mainly includes the light guide body 102, the first microstructures 118 and the second microstructures 120, so that in the fabrication of the light guide element 110, the light guide body 102 is firstly provided, and the first microstructures 118 and the second microstructures 120 are respectively disposed on the first light-emitting surface 104 and the second light-emitting surface 106.

In the light guide element 110, the first microstructures 118 are disposed and distributed on the entire first light-emitting surface 104 of the light guide body 102. On the other side, the second microstructures 120 are disposed and distributed on the entire second light-emitting surface 106 of the light guide body 102. In some examples, the first microstructures 118 are disposed on the first light-emitting surface 104 in rows. In certain examples, the first microstructures 118 and the second microstructures 120 may be respectively arranged based on a first datum line and a second datum line, which are different from each other, and by a first arrangement rule and a second arrangement rule. In one exemplary embodiment, the second datum line is rotationally deviated in relation to the first datum line with an angle to form an included angle between the second datum line and the first datum line. In addition, the first arrangement rule of the first microstructures 118 and the second arrangement rule of the second microstructures 120 may be identical. The first microstructures 118 respectively correspond to the second microstructures 120. Furthermore, in a normal direction 126 of the first light-emitting surface 104, i.e. in a vertical direction, each first microstructure 118 laps over the corresponding second microstructure 120 in part.

In one exemplary embodiment, the first microstructures 118 and the second microstructures 120 have the same size and the same shape. In another exemplary embodiment, the first microstructures 118 and the second microstructures 120 may have different sizes and different shapes, or may have the same shape and different sizes. The shape of the first microstructures and the second microstructures 120 may be a circular form, an elliptical form, a triangular form, a square form, a polygonal form or an irregular form, such as a stellar form and a heart form.

Figure 2:
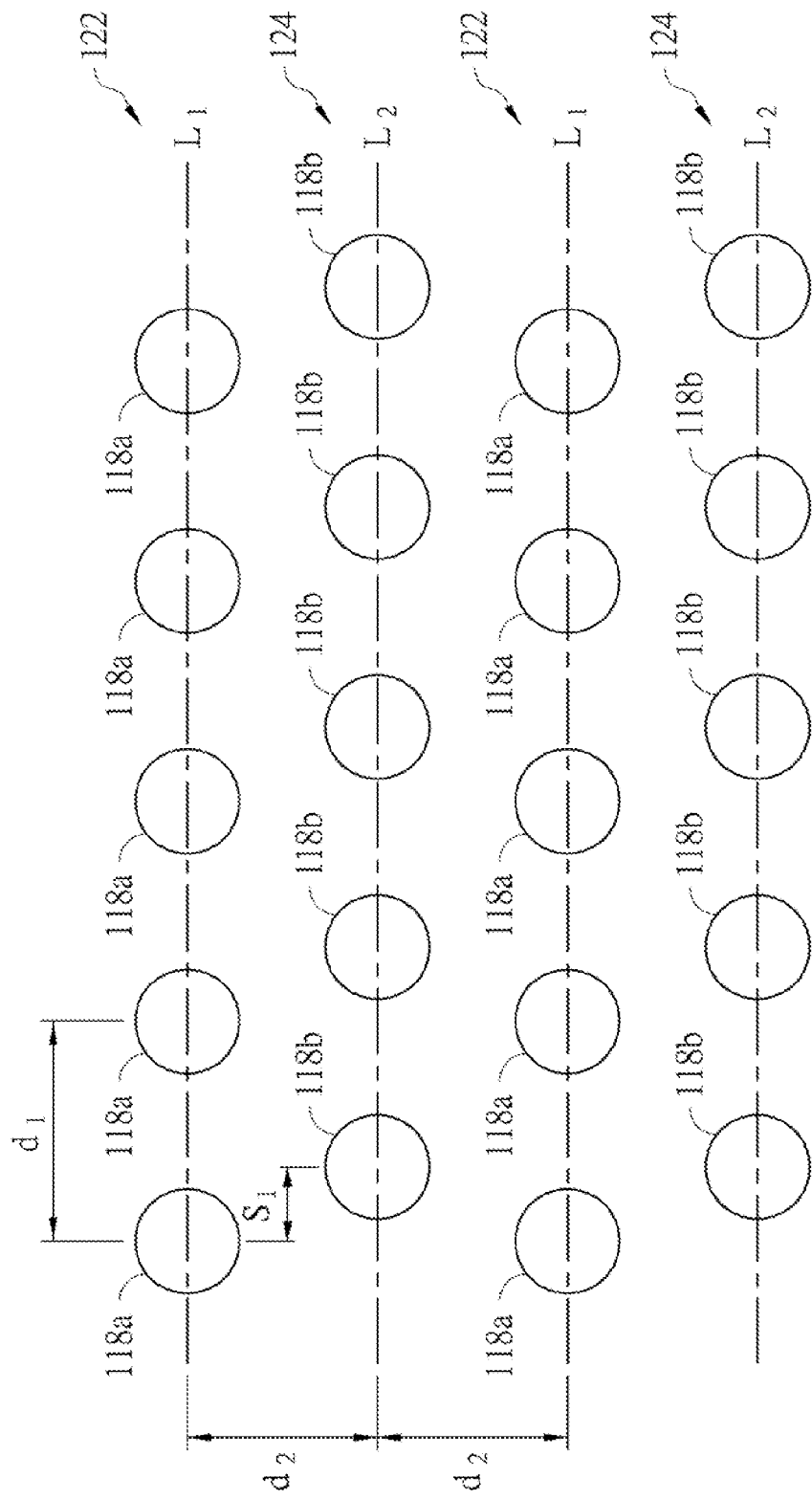
FIG. 2 is a schematic diagram showing an arrangement rule of microstructures in accordance with an embodiment of the present invention.

Refer to FIG. 2. FIG. 2 is a schematic diagram showing an arrangement rule of microstructures in accordance with an embodiment of the present invention. In the present embodiment, the first microstructures 118 are taken to illustrate their first arrangement rule. In the condition, which the first arrangement rule of the first microstructures 118 and the second arrangement rule of the second microstructures 120 are identical, the illustration made according to FIG. 2 can also be as the illustration for the second arrangement rule of the second microstructures 120.

In the present embodiment, the first datum line may be defined firstly. The first datum line may be any side of the first light-emitting surface 104, for example. First microstructures 118a (i.e. first ones of the first microstructures 118) and 118b (i.e. second ones of the first microstructures 118) may be respectively divided into a plurality of first arrangements 122 and a plurality of second arrangements 124. Each of the first arrangements 122 and the second arrangements 124 is one row of the first microstructures 118a and 118b. The first arrangements 122 and the second arrangements 124 are interlaced on the first light-emitting surface 104 to distribute on the entire desired region, such as the entire first light-emitting surface 104 or a partial region of the first light-emitting surface 104. In addition, the adjacent first arrangement 122 and the second arrangement 124 are separated from each other with an interval $d_2$.

In each first arrangement 122, several first microstructures 118a are disposed on a first suppositional line $L_1$, which may be parallel to the first datum line, to uniformly arrange pattern centers of the first microstructures 118a on the first suppositional line $L_1$, i.e. the first microstructures 118a are disposed equidistantly. Therefore, on each first suppositional line $L_1$, any adjacent two of first microstructures 118a have a same interval $d_1$.

In each second arrangement 124, several first microstructures 118b are disposed on a second suppositional line $L_2$, which may be parallel to the first datum line, to uniformly arrange pattern centers of the first microstructures 118b on the second suppositional line $L_2$, i.e. the first microstructures 118b are disposed equidistantly. In addition, on each second suppositional line $L_2$, any adjacent two of first microstructures 118b also have the same interval $d_1$. In each second arrangement 124, a starting point for disposing the first microstructures 118b is deviated from a starting point for disposing the first microstructures 118a of each first arrangement 122 by a distance $S_1$. Furthermore, the distance $S_1$ is less than the interval $d_1$ between two adjacent first microstructures 118a or 118b.

Figure 3:
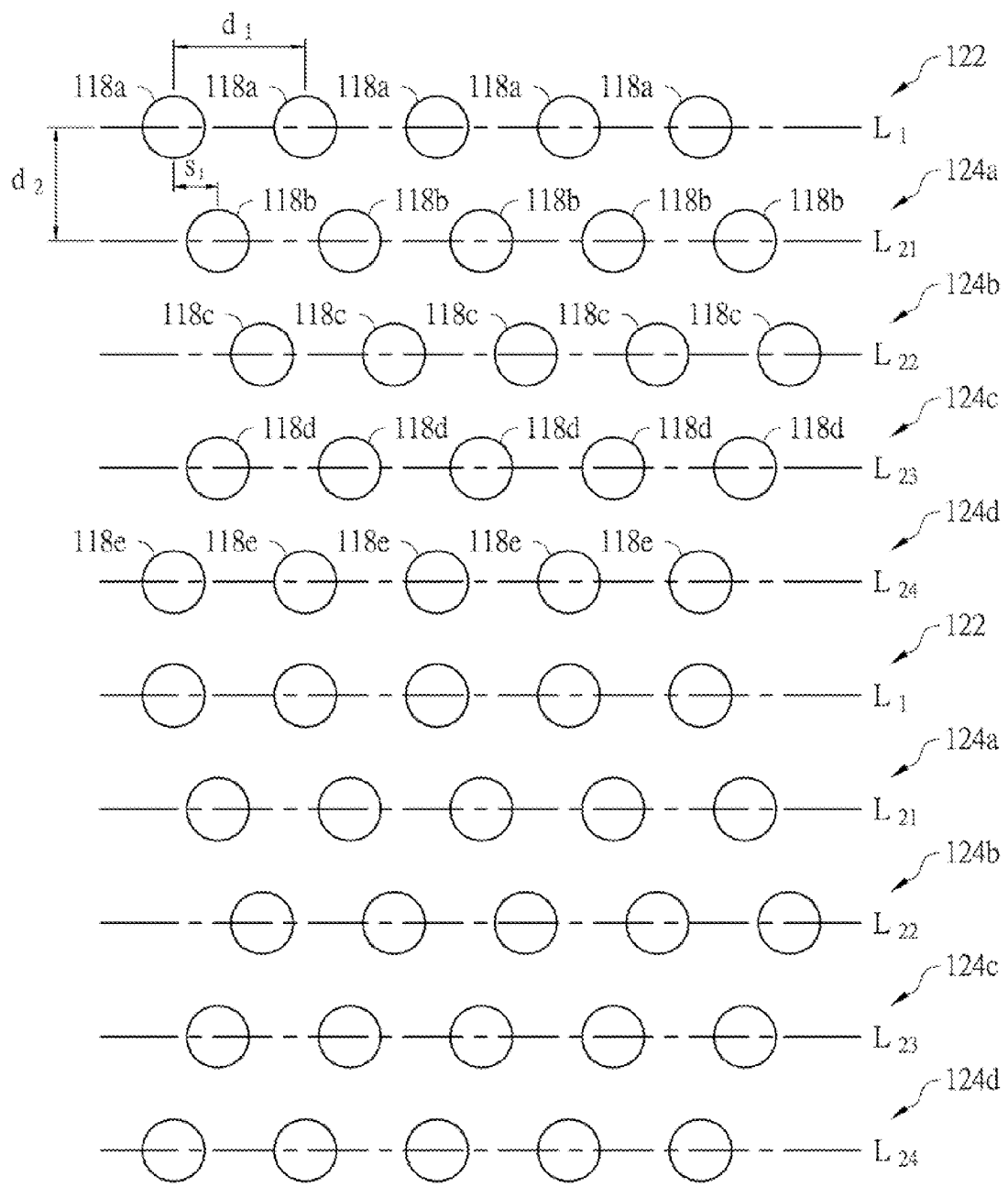
FIG. 3 is a schematic diagram showing an arrangement rule of microstructures in accordance with another embodiment of the present invention.

Refer to FIG. 3. FIG. 3 is a schematic diagram showing an arrangement rule of microstructures in accordance with another embodiment of the present invention. In the present embodiment, the first microstructures 118 are taken to illustrate their first arrangement rule similarly. In the condition, which the first arrangement rule of the first microstructures 118 and the second arrangement rule of the second microstructures 120 are identical, the illustration made according to FIG. 3 can also be as the illustration for the second ngement rule of the second microstructures 120 similarly.

In the present embodiment, the first datum line may be defined firstly. The first datum line may be any side of the first light-emitting surface 104, for example. First microstructures 118a (i.e. first ones of the first microstructures 118) and 118*b*, 118*c*, 118*d* and 118*e* (i.e. second ones of the first microstructures 118) may be respectively divided into one first arrangement 122 and a plurality of second arrangements 124*a*, 124*b*, 124*c* and 124*d*. The first arrangement 122 and the second arrangements 124*a*, 124*b*, 124*c* and 124*d* are disposed on the first light-emitting surface 104 in sequence to form a periodical arrangement. The first arrangement 122 and the second arrangements 124*a*, 124*b*, 124*c* and 124*d* are arranged in sequence to distribute on the entire desired region, such as the entire first light-emitting surface 104 or a partial region of the first light-emitting surface 104, by the periodical arrangement. In addition, any adjacent two of the first arrangement 122 and the second arrangements 124*a*, 124*b*, 124*c* and 124*d* are separated from each other with an interval $d_2$.

In the first rangement 122, several first microstructures 118*a* are disposed on a first suppositional line $L_1$, which may be parallel to the first datum line, to uniformly arrange pattern centers of the first microstructures 118*a* on the first suppositional line $L_1$, i.e. the first microstructures 118*a* are disposed equidistantly. Therefore, on the first suppositional line $L_1$, any adjacent two of first microstructures 118*a* have a same interval $d_1$.

In the second arrangements 124*a*, 124*b*, 124*c* and 124*d*, several first microstructures 118*b*, 118*c*, 118*d* and 118*e* are respectively disposed on second suppositional lines $L_{21}$, $L_{22}$, $L_{23}$ and $L_{24}$, which may be parallel to the first datum line, to uniformly arrange pattern centers of the first microstructures 118*b*, 118*c*, 118*d* and 118*e* on the second suppositional line $L_{21}$, $L_{22}$, $L_{23}$ and $L_{24}$ respectively, i.e. the first microstructures 118*b*, 118*c*, 118*d* and 118*e* are respectively disposed equidistantly. In addition, on the second suppositional lines $L_{21}$, $L_{22}$, $L_{23}$ and $L_{24}$, any adjacent two of first microstructures 118*b*, 118*c*, 118*d* and 118*e* also have the same interval $d_1$.

In the second arrangements 124*a*, 124*b*, 124*c* and 124*d*, starting points for disposing the first microstructures 118*b*, 118*c*, 118*d* and 118*e* are respectively deviated from a starting point for disposing the first microstructures 118*a* by one distance $S_1$, a distance being twice as far as the distance $S_1$, one distance $S_1$ and zero. The distance $S_1$ is less than the interval $d_1$ between two adjacent first microstructures 118*a*, 118*b*, 118*c*, 118*d* and 118*e*. In the present embodiment, a relation between deviation distances of the starting points of the second arrangements 124*a*, 124*b*, 124*c* and 124*d* from the starting point of the first arrangement 122 and distances between the second arrangements 124*a*, 124*b*, 124*c* and 124*d* and the first arrangement 122 can be defined as a functional relation. In one exemplary embodiment, the function may be a sinusoidal function, such as the following formula (1).

$$S = S_{max} \sin x \quad (1)$$

In the formula (1), the value S represents the deviation distance of the starting point of the microstructures of each arrangement, and the value $S_{max}$ represents the amplitude of the sinusoidal function and also represents the largest deviation distance. In addition, the value $x \equiv 2\pi[(n-1)d/D]$, in which the number n is a positive integer and represents the nth arrangement, the value $(n-1)d$ represents the interval between each arrangement and the first arrangement 122, and the value D represents the overall distance of the whole function period.

For example, the number n of the first arrangement 122 is 1, and now the value $x \equiv 2\pi[(n-1)d/D] = 2\pi[(1-1)d_2/D] = 0$. The number n of the second arrangement 124*a* is 2, now the value $x \equiv 2\pi[(n-1)d/D] = 2\pi[(2-1)d_2/D] = 2\pi(d_2/D)$, and the deviation distance of the starting point of the first microstructures 118*b* of the second arrangement 124*a* is $S = S_{max} \sin[2\pi(d_2/D)]$ = the distance $S_1$. The number n of the next second arrangement 124*b* is 3, now the value $x \equiv 2\pi[(n-1)d/D] = 2\pi[(2-1)d_2/D] = 2\pi(d_2/D)$, and the deviation distance of the starting point of the first microstructures 118*c* of the second arrangement 124*b* is $S = S_{max} \sin[2\pi(2d_2/D)]$ = a distance being twice as far as the distance $S_1$. The following arrangements are analogized in sequence.

Figure 4:
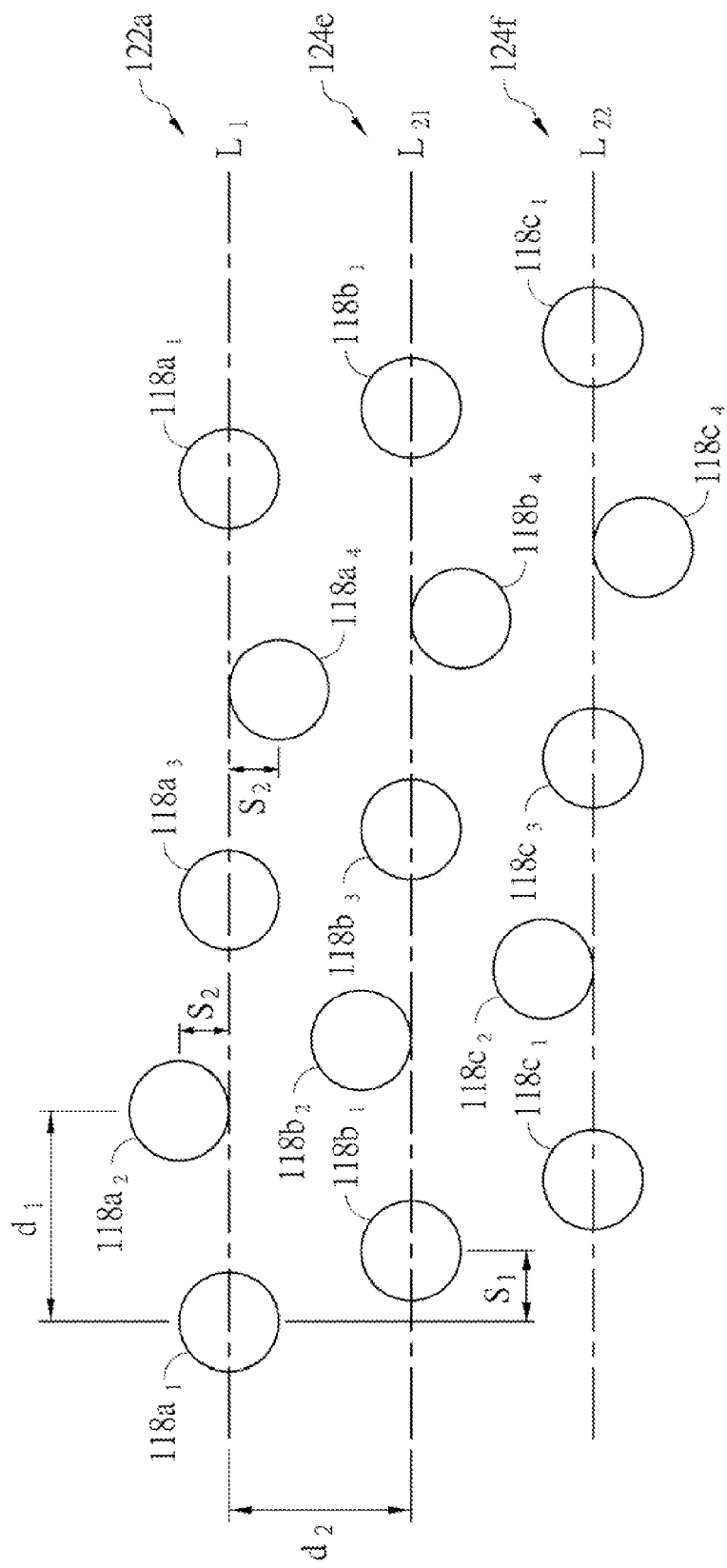
FIG. 4 is a schematic diagram showing an arrangement rule of microstructures in accordance with still another embodiment of the present invention.

Refer to FIG. 4. FIG. 4 is a schematic diagram showing an arrangement rule of microstructures in accordance with still another embodiment of the present invention. In the present embodiment, the first microstructures 118 are taken to illustrate their first arrangement rule similarly. In the condition, which the first arrangement rule of the first microstructures 118 and the second arrangement rule of the second microstructures 120 are identical, the illustration made according to FIG. 4 can also be as the illustration for the second arrangement rule of the second microstructures 120 similarly.

In the present embodiment, the first datum line may be defined firstly. The first datum line may be any side of the first light-emitting surface 104, for example. First microstructures $118a_1$, $118a_2$, $118a_3$ and $118a_4$ (i.e. first ones of the first microstructures 118), and $118b_1$, $118b_2$, $118b_3$, $118b_4$, $118c_1$, $118c_2$, $118c_3$ and $118c_4$ (i.e. second ones of the first microstructures 118) may be respectively divided into one first arrangement 122*a* and a plurality of second arrangements 124*e* and 124*f*. The first arrangement 122*a*, a second arrangement 124*e* and a second arrangement 124*f* are disposed on the first light-emitting surface 104 in sequence, and the subsequent arrangements proceed according to an arrangement rule of arranging the second arrangements 124*e* and 124*f* sequentially to distribute on the entire desired region, such as the entire first light-emitting surface 104 or a partial region of the first light-emitting surface 104. In addition, any adjacent two of the first arrangement 122*a* and the second arrangements 124*e* and 124*f* are separated from each other with an interval $d_2$.

In the first arrangement 122*a*, several first microstructures $118a_1$, $118a_2$, $118a_3$ and $118a_4$ are uniformly and periodically disposed on a first suppositional line $L_1$, may be parallel to the first datum line, in a manner of arranging pattern centers of the first microstructures $118a_1$, $118a_2$, $118a_3$ and $118a_4$ sequentially on the first suppositional line $L_1$, being higher than the first suppositional line $L_1$ with a first height, on the first suppositional line $L_1$, being lower than the first suppositional line $L_1$ with a second height. As shown in FIG. 4, the first height and the second height may be identical, each of which is a height $S_2$, for example. On the first suppositional lines $L_1$, any adjacent two of first microstructures $118a_1$, $118a_2$, $118a_3$ and $118a_4$ have the same interval $d_1$.

In the second arrangements 124*e* and 124*f*, several first microstructures $118b_1$, $118b_2$, $118b_3$ and $118b_4$ and several first microstructures $118c_1$, $118c_2$, $118c_3$ and $118c_4$ are respectively disposed on second suppositional lines $L_{21}$ and $L_{22}$, which may be parallel to the first datum line, in a manner of arranging pattern centers of the first microstructures $118b_1$, $118b_2$, $118b_3$ and $118b_4$ sequentially on the second suppositional line $L_{21}$, being higher than the second suppositional line $L_{21}$ with a first height, on the second suppositional line $L_{21}$, and being lower than the second suppositional line $L_{21}$ with a second height, and arranging pattern centers of the first microstructures $118c_1$, $118c_2$, $118c_3$ and $118c_4$ sequentially on the second suppositional line $L_{22}$, being higher than the second suppositional line $L_{22}$ with one height $S_2$, on the second suppositional line $L_{22}$, and being lower than the second suppositional line $L_{22}$ with one height $S_2$. In addition, on the second suppositional lines $L_{21}$ and $L_{22}$, any adjacent two of first microstructures $118b_1$, $118b_2$, $118b_3$ and $118b_4$, and any adjacent two of first microstructures $118c_1$, $118c_2$, $118c_3$ and $118c_4$ also have the same interval $d_1$.

In the second arrangements 124e and 124f, starting points for disposing the first microstructures $118b_1$ and $118c_1$ are respectively deviated from a starting point for disposing the first microstructures $118a_1$ of the first arrangement 122a by one distance $S_1$ and a distance being twice as far as the distance $S_1$. Next, starting points of a plurality of second arrangements sequentially arranged under the second arrangement 124f are respectively apart from the starting point of the first arrangement 122a by deviation distances, which are increasing progressively by one distance $S_1$ in sequence. The distance $S_1$ is less than the interval $d_1$ between two adjacent first microstructures $118b_1$, $118b_2$, $118b_3$ and $118b_4$ or between two adjacent first microstructures $118c_1$, $118c_2$, $118c_3$ and $118c_4$.

In the present embodiments the arrangements of the microstructures on each suppositional line can be defined as a functional relation. In one exemplary embodiment, the function may be a sinusoidal function, such as the following formula (2).

$$H = H_{max} \sin x \quad (2)$$

In the formula (2), the value H represents the deviation height of the starting point of the microstructures of each arrangement, and the value $H_{max}$ represents the amplitude of the sinusoidal, function and also represents the largest deviation height. In addition, the value $x \equiv 2\pi[(n-1)d/L]$, in which the number n is a positive integer and represents the nth microstructure in one arrangement, the value $(n-1)d$ represents the distance between one first microstructure in one arrangement and the starting point of the arrangement, and the value L represents the overall distance of the whole function period.

For example, in the first arrangement 122a, the number n of the first microstructure $118a_1$ from the start is 1, and now the value $x \equiv 2\pi[(n-1)d/L] = 2\pi[(1-1)d_1/L] = 0$. The number n of the next first microstructure $118a_2$ is 2, now the value $x \equiv 2\pi[(n-1)d/L] = 2\pi[(2-1)d_1/L] = 2\pi(d_1/L)$, and the deviation height of the first microstructure $118a_2$ is $H = H_{max} \sin[2\pi(d_1/L)] =$ the height $S_2$. The number n of the next first microstructure $118a_3$ is 3, now the value $x = 2\pi[(3-1)d_1/L] = 2\pi(2d_1/L)$, and the deviation height of the first microstructure $118a_3$ is $H = H_{max} \sin[2\pi(2d_1/L)] = 0$ because $L = 4d_1$ in the example. The following arrangements are analogized in sequence. In the present embodiment, a relation between deviation distances of the starting points of the second rangements 124e and 124f from the starting point of the first arrangement 122a and distances between the second arrangements 124e and 124f and the first arrangement 122a can be defined as a functional relation. In one exemplary embodiment, the function may be a sinusoidal function, such as the aforementioned formula (1). Referring to FIG. 1 again, after disposing the first microstructures 118 on the first light-emitting surface 104 and the second microstructures 120 on the second light-emitting surface 106 of the light guide element 110, the second datum line is rotationally deviated in relation to the first datum line, so that each first microstructure 118 laps over the corresponding second microstructure 120 in part in the normal direction 126 of the first light-emitting surface 104.

Figure 5:
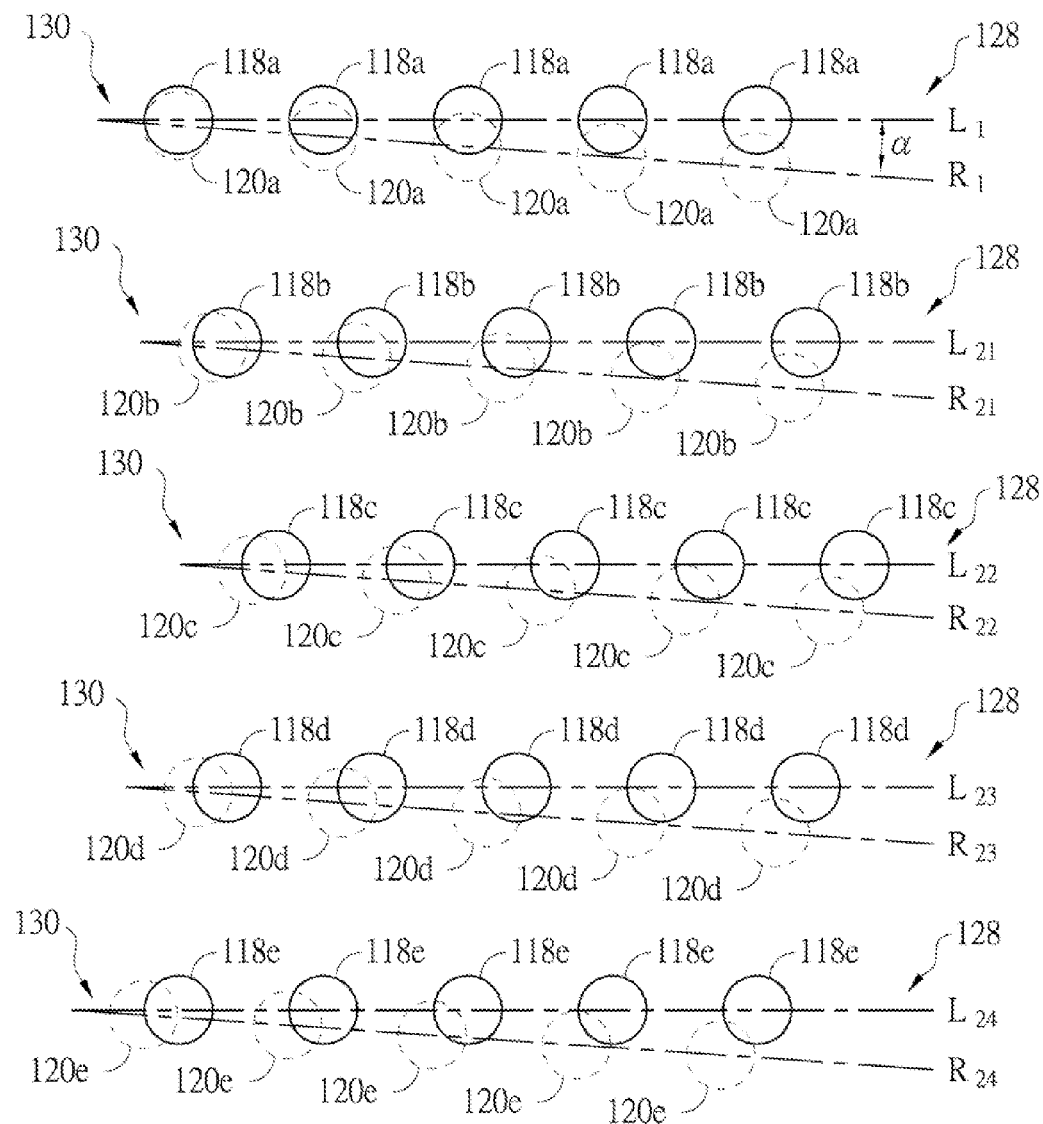
FIG. 5 illustrates a top view of the lapping of first microstructures and second microstructures of a light guide element in accordance with another embodiment of the present invention.

For example, referring to FIG. 1 and FIG. 5, in which FIG. 5 illustrates a top view of the lapping of first microstructures and second microstructures of a light guide element in accordance with another embodiment of the present invention. In the present embodiment, when viewing the light guide element 110 in a direction from the top of the first light-emitting surface 104 toward the second light-emitting surface 106, the second datum line is rotationally deviated in relation to the first datum line with an angle, so that an included angle, such as an included angle α, is formed between each of the first suppositional line $L_1$ and the second suppositional lines $L_{21}$, $L_{22}$, $L_{23}$ and $L_{24}$ on the first light-emitting surface 104 and the corresponding first suppositional line $R_1$ and the second suppositional lines $R_{21}$, $R_{22}$, $R_{23}$ and $R_{24}$ on the second light-emitting surface 106.

Therefore, each of the first microstructures 118a, 118b, 118c, 118d and 118e on the first light-emitting surface 104 and the corresponding second microstructures 120a, 120b, 120c, 120d and 120e on the, second light-emitting surface 106 are partially staggered and partially laps. As shown in FIG. 5, in each row which respectively include the first microstructures 118a, 118b, 118c, 118d or 118e, overlapping ratios of the first microstructures 118a, 118b, 118c, 118d or 118e and the corresponding second microstructures 120a, 120b, 120c, 120d and 120e become greater from one end 128 of one of the rows to the other end 130 of the one of the rows According to the Moiré effect, it is known that when two or more regularly arranged patterns laps with each other with some included angle, another regularly arranged pattern would be formed. Therefore, by regularly arranging the first microstructures 118a, 118b, 118c, 118d and 118e on the first light-emitting surface 104 and the second microstructures 120a, 120b, 120c, 120d and 120e on the second light-emitting surface 106, when an incident light enters the light guide body 102 of the light guide element 110, the emitting light can respectively form a first mesh pattern and a second mesh pattern on the first light-emitting surface 104 and the second light-emitting surface 106. The first mesh pattern and the second mesh pattern may be formed due to the Moiré effect, so that they may be also referred as Moiré mesh patterns.

In one exemplary embodiment, after completing the arrangement design of the first microstructures 118 and the second microstructures 120, a random disturbance may be added to the position of each first microstructure 118 and second microstructure 120. However, the random disturbance should not be too large, so as to keep the Moiré meshes. In addition, after completing the arrangement design of the first microstructures 118 and the second microstructures 120, sizes of the first microstructures 118 and the second microstructures 120 can be modified according to the desired luminous flux of the region, in which the sizes of the first microstructures 118 and the second microstructures 120 is directly proportional to the luminous flux.

Figure 6:
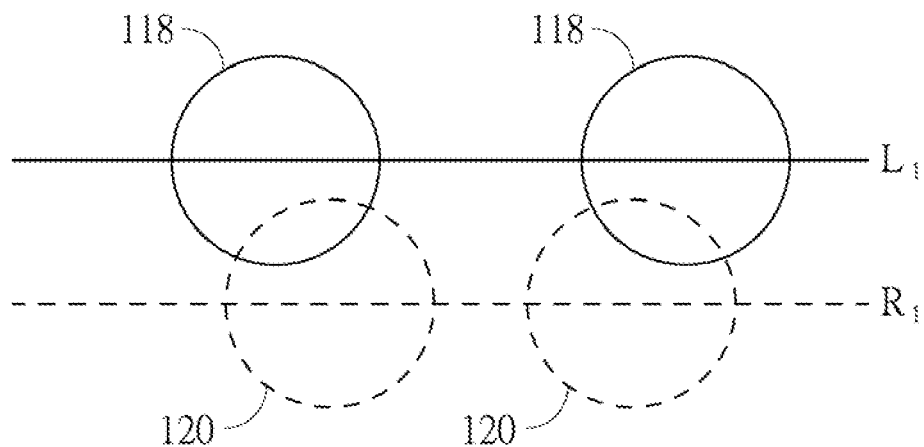
FIG. 6 illustrates a top view of the lapping of first microstructures and second microstructures of a portion of a light guide element in accordance with an embodiment of the present invention.

Referring to FIG. 1 and FIG. 6, in which FIG. 6 illustrates a top view of the lapping of first microstructures and second microstructures of a portion of a light guide element in accordance with an embodiment of the present invention. In the present embodiment, the first microstructures 118 disposed on a first suppositional line $L_1$ and the second microstructures 120 disposed on a first suppositional line $R_1$ have the same size but different pitches. In some examples, when viewing the light guide element 110 in a direction from the top of the first light-emitting surface 104 toward the second light-emitting surface 106, a pattern center of at least one of the first microstructures 118 is misalignment with a pattern center of the corresponding second microstructure 120.

Figure 7:
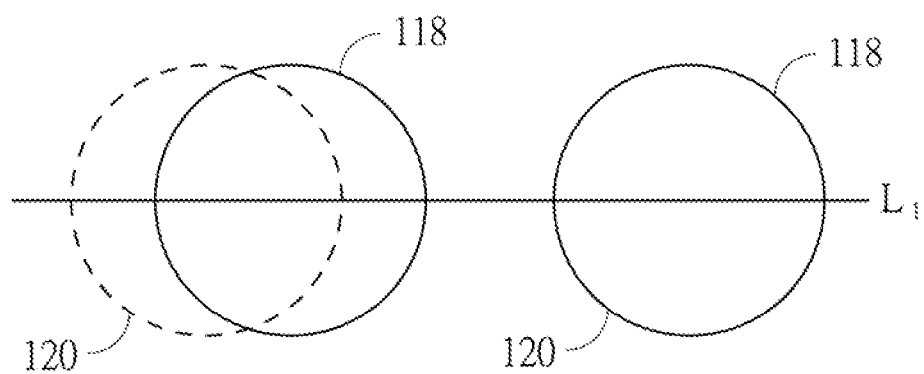
FIG. 7 illustrates a top view of the lapping of first microstructures and second microstructures of a portion of a light guide element in accordance with an embodiment of the present invention.

Referring to FIG. 1 and FIG. 7, in which FIG. 7 illustrates a top view of the lapping of first microstructures and second microstructures of a portion of a light guide element in accordance with an embodiment of the present invention. In the present embodiment, the first microstructures 118 disposed on a first suppositional line $L_1$ and the second microstructures 120 disposed on a first suppositional line $R_1$ have the same size but different pitches. In some examples, when viewing the light guide element 110 in a direction from the top of the first light-emitting surface 104 toward the second light-emitting surface 106, a pattern center of at least one of the first microstructures 118 (such as the right one of the first microstructures 118 in FIG. 7) is alignment with a pattern center of the corresponding second microstructure 120 while a pattern center of the other one of the first microstructures 118 (such as the left one of the first microstructures 118 in FIG. 7) may be misalignment with a pattern center of the corresponding second microstructure 120.

Figure 8:
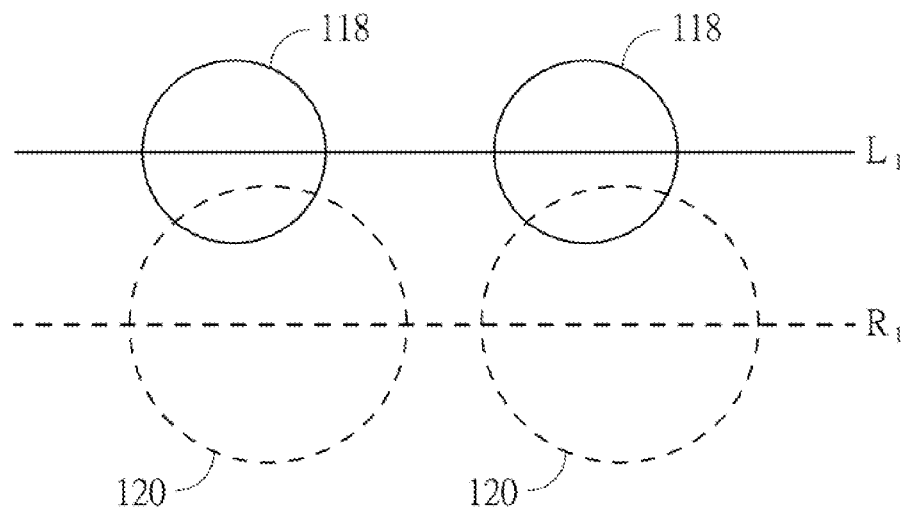
FIG. 8 illustrates a top view of the lapping of first microstructures and second microstructures of a portion of a light guide element in accordance with an embodiment of the present invention.

Referring to FIG. 1 and FIG. 8, in which FIG. 8 illustrates a top view of the lapping of first microstructures and second microstructures of a portion of a light guide element in accordance with an embodiment of the present invention. In the present embodiment, the first microstructures 118 disposed on a first suppositional line $L_1$ and the second microstructures 120 disposed on a first suppositional line $R_1$ have the same pitch but different sizes. For example, as shown in FIG. 8, the size of the first microstructures 118 is smaller than that of the second microstructures 120. In some examples, when viewing the light guide element 110 in a direction from the top of the first light-emitting surface 104 toward the second light-emitting surface 106, a pattern center of at least one of the first microstructures 118 is misalignment with a pattern center of the corresponding second microstructure 120.

Figure 9:
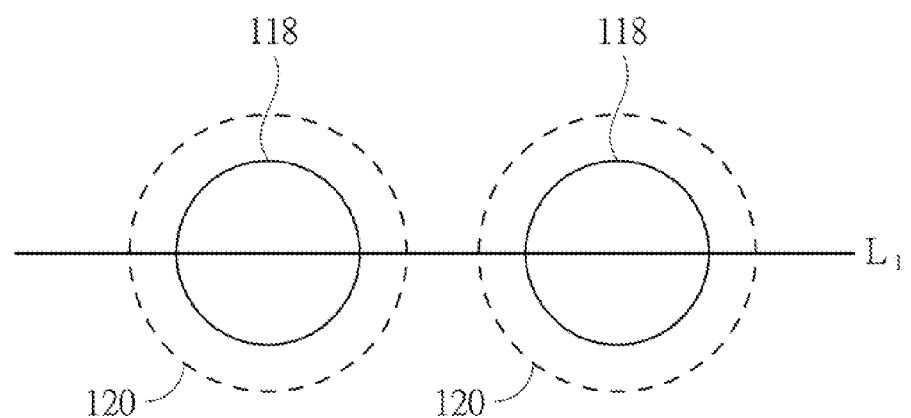
FIG. 9 illustrates a top view of the lapping of first microstructures and second microstructures of a portion of a light guide element in accordance with an embodiment of the present invention.

Referring to FIG. 1 and FIG. 9, in which FIG. 9 illustrates a top view of the lapping of first microstructures and second microstructures of a portion of a light guide element in accordance with an embodiment of the present invention. In the present embodiment, the first microstructures 118 disposed on a first suppositional line $L_1$ and the second microstructures 120 disposed on a first suppositional line $R_1$ have the same pitch but different sizes. For example, as shown in FIG. 9, the size of the first microstructures 118 is smaller than that of the second microstructures 120. In some examples, each of the first microstructures 118 is completely covered by the corresponding second microstructure 120, and when viewing the light guide element 110 in a direction from the top of the first light-emitting surface 104 toward the second light-emitting surface 106, a pattern center of at least one of the first microstructures 118 is alignment with a pattern center of the corresponding second microstructure 120.

When the method of the present invention is used to manufacture a light guide element, luminous intensities of various regions on light-emitting surfaces of the light guide element can be decided according to the real demand of a lighting fixture. Furthermore, when the light guide element is applied to the lighting fixture, each of the two light-emitting surfaces is set with a pattern composed of a plurality of microstructures. The microstructures have less influence on the brightness, so that the brightness and the pattern design of the emitting light of the lighting fixture are both considered. Moreover, mesh patterns of the two light-emitting surfaces of the light guide element in the present invention are effects caused by lapping microstructures of the light-emitting surfaces, so that pattern defects of the emitting light caused by processing defects is blurred.

In addition, the mesh patterns formed on the light-emitting surfaces of the light guide element by the method of the present invention vary as the change of observation angle of an observer. Therefore, compared with the constant pattern formed by directly arranging the microstructures conventionally, the patterns of the emitting light of the light guide element of the present invention are more animated and more variable. Accordingly, when the light guide element is applied to a decorative lighting fixture, a novel design is obtained.

The Moiré mesh can be eliminated by adjusting the arrangement angle of the microstructures of the two light-emitting surfaces in the method of the present invention. The arrangement rule of the present invention is easier, so that it is cheaper as compared with a conventional elimination method of a Moiré mesh by a random arrangement.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A light guide element, including:
    a fight guide body including a first light-emitting surface and a second light-emitting surface opposite to and parallel to each other;
    a plurality of first microstructures, wherein the first microstructures are disposed on the first light-emitting surface in rows, and the first microstructures include:
        a first arrangement, wherein in the arrangement, a plurality of pattern centers of a plurality of first ones of the first microstructures are uniformly disposed on a first suppositional line, and there is an interval between the adjacent first ones; and
        a plurality of second arrangements arranged sequentially, wherein in the second arrangements, a plurality of pattern centers of a plurality of second ones of the first microstructures are uniformly disposed on a plurality of second suppositional lines, there is the interval between the adjacent second ones on each of the second suppositional lines,
    wherein a relation between deviation distances of starting points of the second arrangements from a starting point of the first arrangement and distances between the second arrangements and the first arrangement is a sinusoidal functional relation; and
    a plurality of second microstructures respectively corresponding to the first microstructures, wherein the second microstructures are disposed on the second light-emitting surface.

2. The light guide element according to claim 1, wherein the plurality of pattern centers of a plurality of first ones of the first microstructures are uniformly and sequentially arranged in a manner of making heights of the pattern centers of the first ones being apart from the first suppositional line very as a sinusoidal function; and
    wherein the plurality of pattern centers of a plurality of second ones of the first microstructures are uniformly and sequentially arranged in a manner of making heights of the pattern centers of the second ones being apart from the second suppositional lines very as a sinusoidal function.

3. The light guide element according to claim 1, wherein in each of the rows, each of the first microstructures laps over the corresponding second microstructure in part in a normal direction of the first light-emitting surface, and overlapping ratios of the first microstructures and the corresponding second microstructures become greater from one end of one of the rows to the other end of the one of the rows.

4. A lighting fixture including the light guide element according to claim 1, and at least one light source disposed at at least one side of the light guide element to provide the light guide element with an incident light.

5. A light guide element, including:
   a light guide body including a first light-emitting surface and a second light-emitting surface opposite to and parallel to each other;
   a plurality of first microstructures, wherein the first microstructures are disposed on the first light-emitting surface; and
   a plurality of second microstructures respectively corresponding to the first microstructures, wherein the second microstructures are disposed on the second light-emitting surface;
   wherein each of the first microstructures laps over the corresponding second microstructure in part in a normal direction of the first light-emitting surface; and
   wherein the first microstructures and the second microstructures have the same size but different pitches.

6. The light guide element according to claim 5, wherein a pattern center of at least one of the first microstructures is misalignment with a pattern center of the corresponding second microstructure.

7. The light guide element according to claim 5, wherein a pattern center of at least one of the first microstructures is alignment with a pattern center of the corresponding second microstructure.

8. A lighting fixture including the light guide element according to claim 5, and at least one light source disposed at at least one side of the light guide element to provide the light guide element with an incident light.

9. A light guide element, including:
   a light guide body including a first light-emitting surface and a second light-emitting surface opposite to and parallel to each other;
   a plurality of first microstructures, wherein the first microstructures are disposed on the first light-emitting surface; and
   a plurality of second microstructures respectively corresponding to the first microstructures, wherein the second microstructures are disposed on the second light-emitting surface;
   wherein each of the first microstructures laps over the corresponding second microstructure in part in a normal direction of the first light-emitting surface; and
   wherein the first microstructures and the second microstructures have the same pitch but different sizes.

10. The light guide element according to claim 9, wherein a pattern center of at least one of the first microstructures is misalignment with a pattern center of the corresponding second microstructure.

11. The light guide element according to claim 9, wherein a pattern center of at least one of the first microstructures is alignment with a pattern center of the corresponding second microstructure.

12. A lighting fixture including the light, guide element according to claim 9, and at least one ht source disposed at at least one side of the light guide element to provide the light guide element with an incident light.

* * * * *